United States Patent
Alexander

(10) Patent No.: US 7,831,609 B1
(45) Date of Patent: Nov. 9, 2010

(54) SYSTEM AND METHOD FOR SEARCHING, FORMULATING, DISTRIBUTING AND MONITORING USAGE OF PREDEFINED INTERNET SEARCH QUERIES

(75) Inventor: James Alexander, Mount Kisco, NY (US)

(73) Assignee: Vizibility Inc., New York, NY (US)

( * ) Notice: Subject to any disclaimer, the term of this patent is extended or adjusted under 35 U.S.C. 154(b) by 0 days.

(21) Appl. No.: 12/795,034

(22) Filed: Jun. 7, 2010

Related U.S. Application Data

(60) Provisional application No. 61/236,630, filed on Aug. 25, 2009, provisional application No. 61/348,558, filed on May 26, 2010.

(51) Int. Cl.
G06F 17/30 (2006.01)

(52) U.S. Cl. .................................. 707/765; 715/700

(58) Field of Classification Search ................ 707/713, 707/728, 765, 706; 715/700
See application file for complete search history.

(56) References Cited

U.S. PATENT DOCUMENTS

| | | | |
|---|---|---|---|
| 5,864,863 | A | 1/1999 | Burrows |
| 6,269,362 | B1 | 7/2001 | Broder et al. |
| 6,314,420 | B1 | 11/2001 | Lang et al. |
| 6,338,059 | B1 | 1/2002 | Fields et al. |
| 6,353,825 | B1 | 3/2002 | Ponte |
| 6,363,377 | B1 | 3/2002 | Kravets et al. |
| 6,401,118 | B1 | 6/2002 | Thomas |
| 6,473,752 | B1 | 10/2002 | Fleming, III |
| 6,480,837 | B1 | 11/2002 | Dutta |
| 6,484,162 | B1 | 11/2002 | Edlund et al. |
| 6,490,577 | B1 | 12/2002 | Anwar |
| 6,523,023 | B1 | 2/2003 | Sonnenberg |
| 6,591,261 | B1 | 7/2003 | Arthurs |
| 6,654,735 | B1 | 11/2003 | Eichstaedt et al. |
| 6,671,681 | B1 | 12/2003 | Emens et al. |
| 6,701,310 | B1 | 3/2004 | Sugiura et al. |

(Continued)

OTHER PUBLICATIONS

Dmitri V. Kalashnikov, Zhaoqi Chen, Sharad Mehrotra and Rabia Nuray-Turan, "Web People Search via Connection Analysis," IEEE Transactions on Knowledge and Data Engineering (IEEE TKDE), Nov. 2008, vol. 20, No. 11, pp. 1550-1565.

(Continued)

Primary Examiner—Cheyne D Ly
(74) Attorney, Agent, or Firm—Michael S. Garrabrants; Novak Druce + Quigg LLP

(57) ABSTRACT

A user interface aids in creation of customized pre-defined queries that can be used for identifying particular search results relevant to a topic. Provision can be made to allow express inclusion or exclusion of certain results. Metrics relating to how much the pre-defined query focuses the search can be provided. A pre-defined query can be referenced by a URL, which can be distributed or referenced in content available in any number of locations. When results of the pre-defined search change, a contact associated with the search query can be notified. When a URL is activated, a redirect to the search engine with the customized query can occur, and the contact associated with the query can be notified of the usage of the pre-defined query. Metrics concerning sources of query usage can be produced, based on data gathered while serving the pre-defined query requests.

2 Claims, 17 Drawing Sheets

U.S. PATENT DOCUMENTS

| | | | |
|---|---|---|---|
| 6,704,727 | B1 | 3/2004 | Kravets |
| 6,718,324 | B2 | 4/2004 | Edlund et al. |
| 6,728,704 | B2 | 4/2004 | Mao et al. |
| 7,065,500 | B2 | 6/2006 | Singh et al. |
| 7,072,888 | B1 | 7/2006 | Perkins |
| 7,124,129 | B2 | 10/2006 | Bowman et al. |
| 7,152,064 | B2 | 12/2006 | Bourdoncle et al. |
| 7,158,966 | B2 | 1/2007 | Brill et al. |
| 7,293,017 | B2 | 11/2007 | Hurst-Hiller et al. |
| 7,644,072 | B2 | 1/2010 | Budzik et al. |
| 7,680,856 | B2 | 3/2010 | Qureshi |
| 7,680,860 | B1 | 3/2010 | Fordham |
| 7,716,206 | B2 | 5/2010 | Aaron |
| 7,716,207 | B2 | 5/2010 | Odom et al. |
| 7,716,236 | B2 | 5/2010 | Sidhu et al. |
| 2004/0215608 | A1 | 10/2004 | Gourlay |
| 2005/0055341 | A1* | 3/2005 | Haahr et al. ............ 707/3 |
| 2006/0004708 | A1 | 1/2006 | Hartmann et al. |
| 2006/0206454 | A1 | 9/2006 | Forstall et al. |
| 2007/0038621 | A1 | 2/2007 | Weyand et al. |
| 2007/0156663 | A1 | 7/2007 | Slackman |
| 2007/0162424 | A1* | 7/2007 | Jeh et al. ............ 707/2 |
| 2007/0208701 | A1 | 9/2007 | Sun et al. |
| 2007/0233672 | A1 | 10/2007 | Sanfacon et al. |
| 2008/0256055 | A1 | 10/2008 | Cloward |
| 2008/0319944 | A1 | 12/2008 | Venolia et al. |
| 2008/0319975 | A1 | 12/2008 | Morris et al. |
| 2009/0013033 | A1 | 1/2009 | Converse et al. |
| 2009/0019030 | A1 | 1/2009 | Smolyanskiy |
| 2009/0119254 | A1 | 5/2009 | Cross et al. |
| 2009/0164929 | A1 | 6/2009 | Chen et al. |
| 2009/0193352 | A1* | 7/2009 | Bunn ............ 715/780 |
| 2009/0282021 | A1 | 11/2009 | Bennett |
| 2010/0057798 | A1 | 3/2010 | Zhang et al. |
| 2010/0070486 | A1 | 3/2010 | Punaganti Venkata et al. |
| 2010/0070504 | A1 | 3/2010 | Busalacchi et al. |
| 2010/0076919 | A1 | 3/2010 | Chen et al. |
| 2010/0082590 | A1 | 4/2010 | Nye |
| 2010/0082594 | A1 | 4/2010 | Bhat et al. |
| 2010/0094853 | A1 | 4/2010 | Telloli et al. |
| 2010/0094863 | A1 | 4/2010 | Kenton-Dau et al. |
| 2010/0106706 | A1 | 4/2010 | Rorex et al. |
| 2010/0106717 | A1 | 4/2010 | Melman |
| 2010/0114864 | A1 | 5/2010 | Agam et al. |
| 2010/0114872 | A1 | 5/2010 | Gupta |
| 2010/0114873 | A1 | 5/2010 | Gupta |
| 2010/0114874 | A1 | 5/2010 | Hansson et al. |
| 2010/0114876 | A1 | 5/2010 | Mandel et al. |
| 2010/0114925 | A1 | 5/2010 | Shafer et al. |

OTHER PUBLICATIONS

Bill Kules, Jack Kustanowitz and Ben Shneiderman, "Categorizing Web Search Results into Meaningful and Stable Categories Using Fast-Feature Techniques," Proceedings of the 6th ACM/IEEE-CS joint conference on Digital libraries, Chapel Hill, NC, 2006, pp. 210-219, ACM, New York, NY.

Jie Yuan, Xinzhong Zhu, Jianmin Zhao and Huiying Xu, "An Individual Web Search Framework Based on User Profile and Clustering Analysis," Proceedings—2008 the 1st IEEE International Conference on Ubi-Media Computing and Workshops, U-Media2008, 2008, pp. 106-112.

Ray-I Chang and Yu-Ying Wu, "Internet Search by Active Feedback," IEEE 7th International Symposium on Communications and Information Technologies (ISCIT 2007), 2007, pp. 1524-1529.

S. Davies, S. Badem, M.D. Williams and R. King, "'Google by Reformulation': Modeling Search as Successive Refinement," Proceedings of the 2004 IEEE International Conference on Services Computing, pp. 435-440, 2004, IEEE Computer Society, Washington, DC.

S. Adali, B. Hill and M. Magdon-Ismail, "The Impact of Ranker Quality on Rank Aggregation Algorithms: Information vs. Robustness," ICDEW, Proceedings of the 22nd International Conference on Data Engineering Workshops, 2006, IEEE Computer Society, Washington, DC.

Rashid Ali and M.M. Sufyan Beg, "Aggregating Subjective and Objective Measures of Web Search Quality using Modified Shimura Technique," 9th International Conference on Information Technology (ICIT '06), Dec. 18-21, 2006, pp. 231-234, Bhubaneswar, India, IEEE Computer Society, Washington, DC.

Rashid Ali and M.M. Sufyan Beg, "Aggregating Content and Connectivity based Techniques for the Measurement of Web Search Quality", 14th International Conference on Advance Computing and Communication (ADCOM 2006), Dec. 20-23, 2006, NIT Surathkal, India, pp. 44-49, IEEE Computer Society, Washington, DC.

K. Chakrabarti, M. Ortega-Binderberger, S. Mehrotra and K. Porkaew, "Evaluating Refined Queries in Top-k Retrieval Systems," IEEE Transactions on Knowledge and Data Engineering, vol. 16, No. 2, Feb. 2004, pp. 256-270, 2004, IEEE Computer Society, Washington, DC.

A. Gupta, S. Sudarshan and S. Viswanathan, "Query Scheduling in Multi Query Optimization," Proceedings of the International Database Engineering & Applications Symposium, pp. 11-19, 2001, IEEE Computer Society, Washington, DC.

Bernard J. Jansen and Caroline M. Eastman, "The Effects of Search Engines and Query Operators on Top Ranked Results," Proceedings of the International Conference on Information Technology: Computers and Communications, ITCC, 2003, IEEE Computer Society, Washington, DC.

Tien N. Nguyen and Jin Zhang, "A Novel Visualization Model for Web Search Results," IEEE Transactions on Visualization and Computer Graphics, vol. 12, No. 5, Sep./Oct. 2006, pp. 981-988, 2006 IEEE Computer Society, Washington, DC.

* cited by examiner

Vizibility™ beta

Vizibility Features    Partners    Help

Introducing the world's first "Google Me" button.

A Vizibility™ PreSearch™ instantly returns the search results you want others to see first. Easily add your SearchMe™ link to your LinkedIn, Facebook and other online profiles. Get notified when your search results change. Receive alerts when you are Googled.

Get yours free today!

1 Tell us your name.

| First Name (Required) |
| Hoover |
| Maiden Name |
— 1205

2 Tell us where you have worked.

| White House |
| Before That |
— 1210
[+]
— 1211

3 Tell us what else you want in your results.

| President |
| Keywords |
— 1215
[+]

[ Get Vizibility! ] — 1220

© 2010 Vizibility Inc.

FIG. 12

Vizibility™ beta

Vizibility Features   Partners   Help

Refine your search by adding employers, divisions/products and other keywords on the right. If there are words you want to exclude, you can add those too. If you still have a result that you don't want, click the "Remove" button next to it for other options.

Results for: +" hoover" AND +"white house" OR +"president" — 1313

- ⦿ Keep  ○ Remove  Herbert Hoover - Wikipedia, the free encyclopedia
  Hoover invented his own sport to keep fit while in the White House...
  http://en.wikipedia.org/wiki/Herbert_Hoover

- ○ Keep  ⦿ Remove  J. Edgar Hoover - Wikipedia, the free encyclopedia
  On May 10,1924, Hoover was appointed by President Calvin Coolidge to be the sixth...
  http://en.wikipedia.org/wiki/J_Edgar_Hoover

- ⦿ Keep  ○ Remove  Herbert Hoover | The White House
  This site is a source for information about President, White House news and policies...
  http://www.whitehouse.gov/presidents/herberthoover

- ⦿ Keep  ○ Remove  President Herbert Hoover | 31st United States President | The ...

- ○ Keep  ⦿ Remove  Was there any blood relation between President Herbert Hoover and...
  Was there any blood relation between President Herbert Hoover and FBI Director J Edgar Hoover... http://funtrivia.com/askft/Question98217.html

1405 — 1303

[ Refine PreSearch ]

Your Name
[ Hoover ]

Employment
[ White House ] [ − ]   — 1335
Add Dept./Product [ + ]
New Employer

Additional Keywords
[ president ] [ − ]   — 1345
New Keyword [ + ]

Excluded Word
[ edgar ] [ − ] — 1410
New Excluded Word [ + ]

[ Refine PreSearch ] — 1330

[ Keep All & Show Next ]  [ I'm Finished ]
    1320              1325

© 2010 Vizibility Inc.

FIG. 14

Removing Results
You have three options to try removing this unwanted result from your Vizibility PreSearch:

Was there any blood relation between President Herbert Hoover and ... ~1505
http://www.funtrivia.com/askft/Question98217.html Cancel Option 1 - BEST ~1510
Make your PreSearch more specific by adding additional employers, departments, products and keywords.

Close Window and Refine Search ~1530

Option 2 - GOOD ~1515
We have identified significant keywords on the web page that can be used to exclude it.
Select words from those below that will be used to exclude it from results.

President  Herbert  Hoover  FBI  Director  Help
Trivia  Quizzes  Games  People  Services  Looking  Visit
Player  Currently  FREE  Started  Revisited  Post
Store  Questions  Unanswered  Archives  Edgar  Asked  BRY2K
Question  Goto
PM  Create Excluded Words
FREE ☐
Goto ☐
Edgar ☐
Player ☐

Exclude Words and Rerun Search

~1520

Option 3 - OK
Exclude the entire website from your PreSearch results: funtrivia.com

Exclude Site and Rerun Search

Vizibility™ beta

Vizibility Features   Partners   Help

Refine your search by adding employers, divisions/products and other keywords on the right. If there are words you want to exclude, you can add those too. If you still have a result that you don't want, click the "Remove" button next to it for other options.

Results for: +" hoover" AND +"white house" OR +"president" OR + "stanford" -"edgar" -"squidblogs" -"amazon.com" —1313

⊙Keep  ○Remove   Hoover Institution

⊙Keep  ○Remove   Hoover Institution - Library and Archives

⊙Keep  ○Remove   Herbert Hoover - Wikipedia, the free encyclopedia

⊙Keep  ○Remove   Hoover Institution - Wikipedia, the free encyclopedia

[Keep All & Show Next]  [I'm Finished]
       1320              1325

TIP FOR SUBSCRIBERS! If you want to be notified of changes to your search results, make sure you view the maximum number of results (up to 64) before clicking "I'm Finished". You're only notified of changes to results you keep.

© 2010 Vizibility Inc.

[Refine PreSearch]

Your Name
[Hoover]

Employment
[White House] [−]  —1335
Add Department/Product
[New Employer] [+]

Additional Keywords
[president] [−]  —1345
[stanford] [−]  —1620
New Keyword [+]

Excluded Word
[edgar] [−]  —1410
[squidblogs] [−]  —1610
[amazon.com] [−]  —1615
New Excluded Word [+]

[Refine PreSearch] —1330

FIG. 16

Vizibility™ beta

Vizibility Features    Partners    Help

Create Account

Getting Vizibility is easy. Choose a unique alias for your personal PreSearch URL that will link directly to your custom search. Next enter your email and password that you will use to sign into your account.

Create your personal PreSearch URL.
Alias must be between 4 and 16 characters http://vizibility.com/ [HerbertHoover]  ← 1705

What is your email address?
[                    ]

Re-enter email address:
[                    ]

What is your password?
Password must be at least 6 characters
[                    ]

Re-enter your password:
[                    ]   ← 1710

☑ I Agree with the Terms of Service

[Create Account]

[No Thanks]

We're sorry you do not want to get your free personal PreSearch URL.
To permanently delete your PreSearch and go back to the homepage, click "I Do Not Want to Create an Account." To continue creating your account, click "I Want to Create an Account".

[I Do Not Want to Create an Account]    [I Want to Create an Account]

© 2010 Vizibility Inc.

SYSTEM AND METHOD FOR SEARCHING, FORMULATING, DISTRIBUTING AND MONITORING USAGE OF PREDEFINED INTERNET SEARCH QUERIES

CROSS REFERENCE TO RELATED APPLICATIONS

This application claims priority from and incorporates U.S. provisional application No. 61/236,630, entitled "SYSTEM AND METHOD FOR SEARCHING, FORMULATING, DISTRIBUTING AND MONITORING USAGE OF PREDEFINED INTERNET SEARCH QUERIES", filed on Aug. 25, 2009, and from U.S. provisional application No. 61/348,558, entitled "SYSTEM AND METHOD FOR SEARCHING, FORMULATING, DISTRIBUTING AND MONITORING USAGE OF PREDEFINED INTERNET SEARCH QUERIES", filed on May 26, 2010, all of which are incorporated by reference in their entirety, for all purposes, herein.

BACKGROUND

1. Field

Aspects disclosed herein relate to the information searching, and more particularly to systems and methods for enhancing internet searches.

2. Related Art

Internet users are increasingly finding navigating document collections to be difficult because of the increasing size of such collections. Likewise, companies, individuals and other organizations wishing to be found by Internet users face growing challenges with maintaining their online visibility. For example, it is estimated that the World Wide Web on the Internet includes more than 11 billion pages in the publicly indexable Web across more than 110 million web sites. Consequently, finding desired information in such a large collection, unless the identity, location, or characteristics of a specific document or search target are well known, can be much like looking for a needle in a haystack. The World Wide Web is a loosely interlinked collection of documents (mostly text and images) located on servers distributed over the Internet. Generally speaking, each document has an address, or Uniform Resource Locator (URL), in the exemplary form "http://www.server.net/directory/file.html". In that notation, the "http:" specifies the protocol by which the document is to be delivered, in this case the "HyperText Transport Protocol." The "www.server.net" specifies the name of a computer, or server, on which the document resides; "directory" refers to a directory or folder on the server in which the document resides; and "file.html" specifies the name of the file. URLs can be extremely long, complex strings of machine readable code.

Most documents on the Web are in HTML (HyperText Markup Language) format, which allows for formatting to be applied to the document, external content (such as images and other multimedia data types) to be introduced within the document, and "hotlinks" or "links" to other documents to be placed within the document, among other things. "Hotlinking" allows a user to navigate between documents on the Web simply by selecting an item of interest within a page. For example, a Web page about reprographic technology might have a hotlink to the Xerox corporate web site. By selecting the hotlink (often by clicking a marked word, image, or area with a pointing device, such as a mouse), the user's Web browser is instructed to follow the hotlink (usually via a URL, frequently invisible to the user, associated with the hotlink) and read a different document. A user cannot be expected to know or remember a URL for each and every document on the Internet, or even URLs for those documents in a smaller collection of preferred documents.

Accordingly, navigation assistance is not only helpful, but important for practical internet usage. Such navigation assistance is typically providing via an Internet based search engine, such as Google®, Microsoft's Bing®, Yahoo!® or the like. Accordingly, when an Internet user desires to find information about a company, individual or organization, the Internet user will frequently turn to a "search engine" to locate the information. A search engine serves as an index into the content stored on the Internet.

"Google" (www.google.com) is an example of a search engine. It operates in a similar manner to traditional keyword-based search engines, in that a search begins by the user's entry of one or more search terms used in a pattern-matching analysis of documents on the Web. It differs from traditional keyword-based search engines in that search results are ranked based on a metric of page "importance," which differs from the number of occurrences of the desired search terms (and simple variations upon that theme). Regardless of the proprietary nature of any given search engines' approach, Internet users searching for companies, individuals or organizations with similar characteristics (i.e. name, industry, etc.) often receive search results that are inaccurate, or relate to entities other than the intended search target. For example, a search for "John Smith", with the intention of obtaining information about a particular person by that name, will return many results about different "John Smith's, such that the desired John Smith may not have any relevant results. In these instances, the Internet user may build more complex search queries to generate more relevant results, which is only possible if the Internet user possesses information that can be used as a basis for such queries.

It is understood and well documented that it is desirable for companies, individuals and organizations to appear early in search results for personal, financial and other reasons. Prominence in search results for a given term or terms in search engines is a form of third party validation, at least in that Internet users place a higher value on entries in top search results because of their perceived relevance, success, and size. Therefore, viewership of search results or click throughs for search results on subsequent results pages declines precipitously.

Search Engine Optimization (SEO) has emerged as a category of services available to operators of web sites. SEO provides for deliberately engineering prominent placement in search results by tailoring web sites to the algorithms employed by a given search engine. In addition to SEO, 'paid search' may be utilized to display an advertisement on the top pages of search results for a given search term(s). SEO, paid search and other optimization strategies are typically only engaged by organizations due to their complexity and cost. Individuals have fewer options to achieve optimal placement in search results.

Google Profiles is one example of a mechanism individuals can utilize to offer information specific to themselves. Google Profiles does not influence search results, however, and individuals with even slightly common names often find themselves in a long list with others, eliminating the value of the feature. SEO, paid search, Google Profiles, and other similar optimization strategies are reactive in that they only influence but do not control what is returned in search results. These strategies are necessary because the natural search behavior of Internet users favors implementation of less sophisticated search queries or the Internet user simply does not possess the information necessary to build a complex search query that will allow the return of appropriately focused results. When companies, individuals or organizations with similar characteristics engage like optimization strategies, however, the differentiation gained from them diminishes and the value declines for them and Internet users alike.

SUMMARY

Aspects disclosed herein provide that an entity (e.g., companies, individuals or organizations) can create, in advance, a specific search query (a PreSearch Query) that yields search results that are accurate (or accurate within an acceptable range) (here, accurate can include that the results returned are relevant to the topic for which the entity has created the query, and that those relevant results are not obscured by irrelevant results. In one preferred aspect, the PreSearch Query can be embodied in a short, easy-to-remember URL, saved, distributed, placed on web pages, such as including social networking homepages, and monitored for changes in search results and usage.

Unlike reactive optimization strategies that seek to influence the way results are developed and displayed after a search is started by a user, a PreSearch Query is formed proactively, in that the search is done in advance, such as by a target of the search. An Internet user need only enter, or cause to be entered, the PreSearch Query into the search engine of their choice, which can be done by clicking on a URL containing the search query or a hotlink to it through a redirected, short URL. In the case of the latter, a redirected PreSearch Query can be monitored for usage, providing information concerning usage of the PreSearch Query (such as who is using the query, and when), both to the entity that created the query, and to the system causing the redirection.

BRIEF DESCRIPTION OF THE DRAWINGS

Aspects according to this disclosure may be understood by reference to the following detailed description, which references the accompanying drawings, in which:

FIGS. 12-18 depict examples of user interfaces that can be used in performing the methods described herein;

FIGS. 21 and 22 depict a UI example of how query result changes can be indicated to a contact associated with a pre-defined query.

DESCRIPTION

Figure 1:
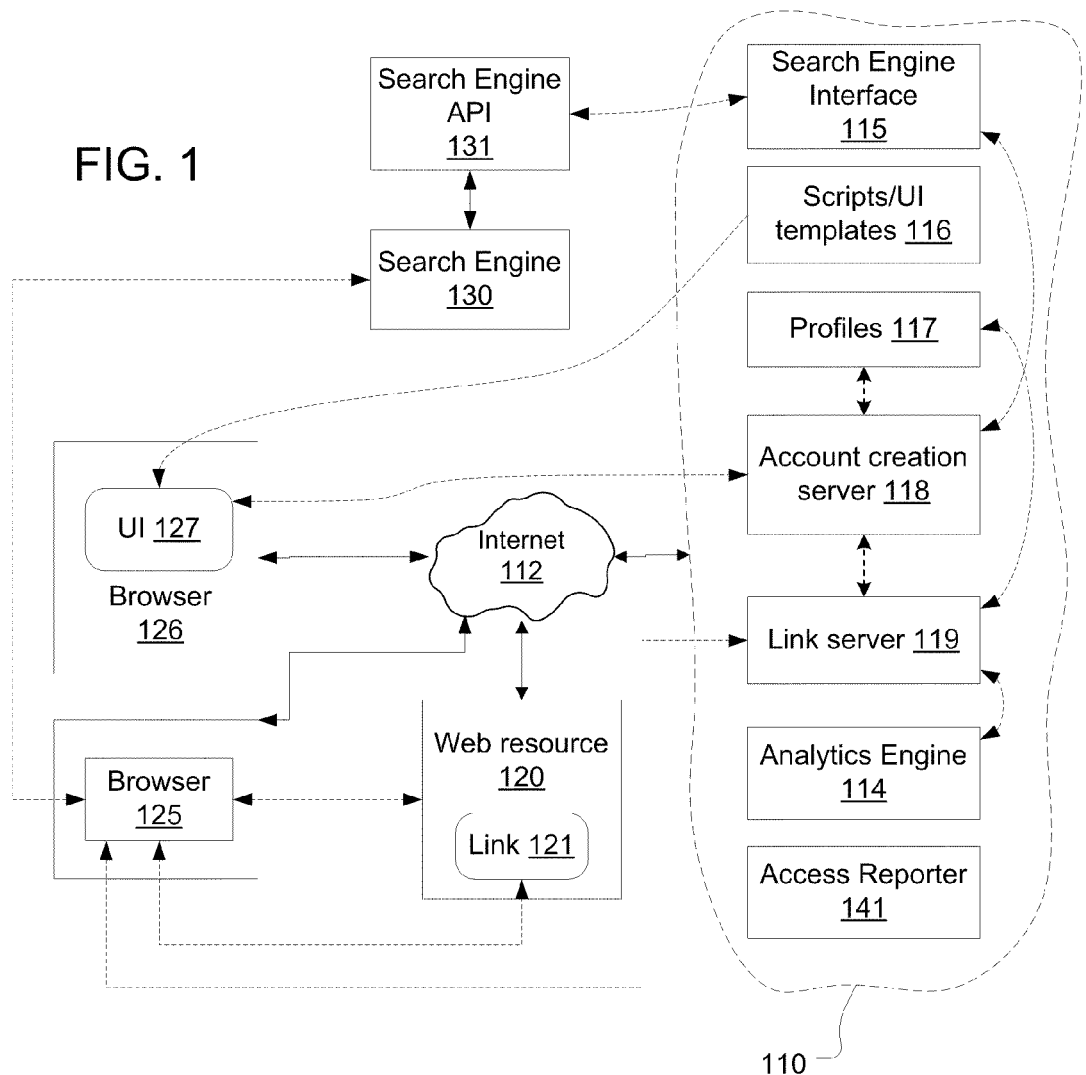
FIG. 1 depicts an arrangement of components and systems that will be referenced in describing aspects and examples according to the disclosure.

FIG. 1 depicts components of an internet-based example of a system in which aspects described herein can be practiced. In FIG. 1, solid lines generally indicate a defined network connection, while dashed lines indicate a logical flow of communication, as will be described below.

More particularly, FIG. 1 depicts an internet 112 (e.g., the Internet), through which a variety of components, described below, may communicate with each other. One functional grouping of components is search query provider 110.

Search query provider 110 can be used by an entity (e.g., a person) to obtain a definition of a search query. A link or referenced to the query definition can be distributed to third parties, for use in obtaining information about a particular subject (e.g., the person who created the pre-defined query, an organization, object, place, concept, product, service, event, or the like). Because the query is defined prior to the time that it is used, typically by an entity other than an entity that is intended to use the query to obtain the information, such a search query is called a "pre-search query" herein.

In other words, the query is defined by a process performed prior to distribution of the query (or references to the query) for use in searching. Typically, the query is defined with a view to tailoring the results that are returned from the query to a desired subject, as will be described below. For example, the query can be formed during a process performed in a machine, which may interact with a person. In one example, the process can be performed to define a query that will return search results about a selected person, and in such a case, the person intended to be the subject of the query may perform the process. In another example, if the query is intended to be for a product, then a marketing employee of a company producing or selling the product may initiate or engage in the query formation process for that product. To be clear, a pre-search query is not confined to being used only for people. Therefore, creation of a pre-search query for a person, as in the principal examples herein is for ease and clarity of explanation, and not by way of limitation.

Returning to search query provider 110, an example composition of search query provider 110 includes a search engine interface 115, which interfaces with one or more search engines (a search engine 130 is depicted), such as through respective Application Programming Interfaces (APIs) provided by the search engines (an API 131 for search engine 130 is depicted). Search query provider 110 also has a store of scripts (e.g., javascripts) and UI templates 116, which as will be described below are for use in configuring a UI 127 located at a browser 126, which is used (in this example) for creating a pre-search query (such scripts also can be run on other devices, such as on server resources). An account creation server 118 also is provided for interfacing with UI 127, and includes information gathering functionality that can be implemented through UI 127.

A link server 119 is provided to accept requests for a resource identified by a link (e.g., a link 121 made available on a web resource 120), which can be selected or otherwise activated by a browser 125, which is accessing web resource 120. An analytics engine 114 communicated with link server 119, and operates to obtain and analyze information available from such linking activities. In a particular example, a pre-search query can be referenced by link 121, such that when link 121 is activated (e.g., by clicking on a visual depiction of the link, in a page served by web resource 120 to browser 125), information about browser 125, and a device on which it is running can be obtained.

As will be described further below, various constituent elements of search query provider 110 communicate with each other, in order to perform query definition steps delineated in the examples that follow. For example, account creation server 118 can store profile information in profile storage (profiles 117). Also, account creation server 118 can update link information on link server 119 (e.g., to publish a new link that can be used or otherwise distributed). Similarly, account creation server 118 may communicate with search engine interface 115 for providing trial queries to be submitted to search engine 130, and to receive results returned responsive to those queries.

Browsers 125 and 126 may be implemented using Internet browsers, such as Internet Explorer, Firefox, Opera, Safari or browsers provided on mobile phones, smart phones, PDAs, or other Internet-connected appliances.

Figure 2:
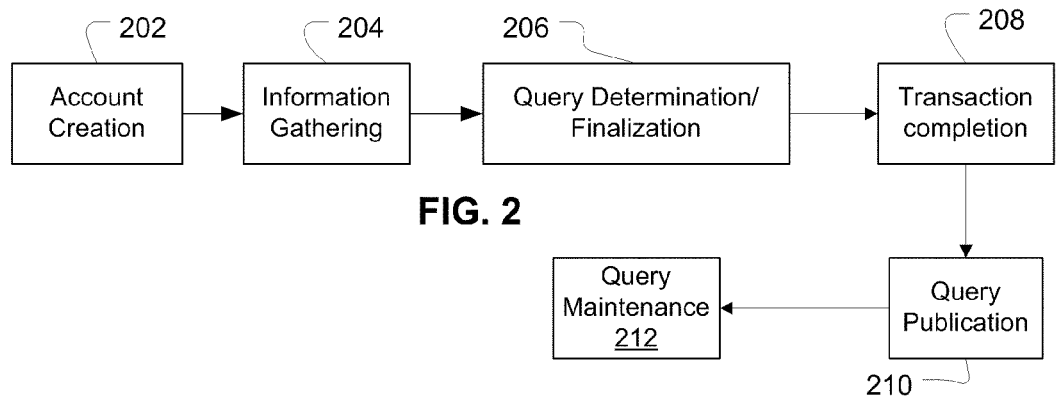
FIG. 2—depicts an overview of method including a number of components that can be used in pre-search query definition and usage.

FIG. 2 depicts an overview method which can be performed in defining a query according to this disclosure. Further constituent method elements are described in the following figures, which can be used in the method depicted in FIG. 2. Not all portions of the depicted method need be performed in every system or method according to this disclosure, as will become apparent.

Figure 3:
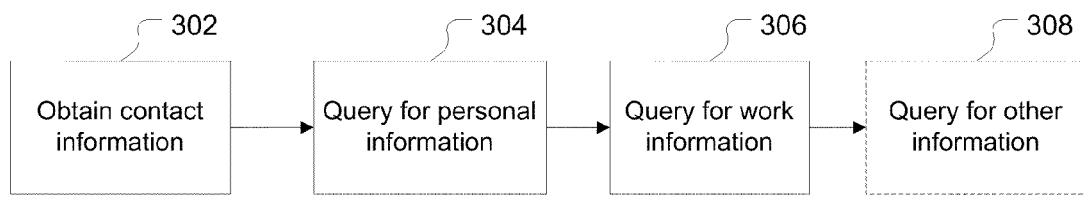
FIG. 3 depicts an approach to obtaining information that can be used in pre-search query creation.

FIG. 2 depicts that a method according to this disclosure may include account creation (202), information gathering (204), query determination (206), transaction completion (208), and query publication (210). An example approach to account creation (202) and information gathering (204) is depicted in FIG. 3; examples of approaches to query determination (206) or components thereof are depicted in FIGS. 4-8. FIG. 2 thus discloses, as an overview, that formation or determination of a pre-search query can include one or more information gathering activities, and a query determination activity. The query determination activity is for using portions of the gathered information, to produce a query that will cause a search engine to return results desired by a party supplying the information (such results can be produced to third parties, who can access the query). The query determination activity is addressed in further detail below, with a variety of examples for reference by those of ordinary skill in implementing such disclosures.

Automated or shared login services, such as those provided by Facebook®, OpenID, Google®, or Yahoo! Inc.® can be used in the method depicted in FIG. 2, such as for obtaining (302) contact information, as well as for account creation. Additionally, membership in social networking sites such as LinkedIn®, Facebook and others may be solicited. Information gathered for creating an account can include a first name, a last name, email address, URL for public profile with employment history (i.e. LinkedIn, Facebook, MySpace®, etc.) and a desired password. As will be explained, such information can be queried in a structured format, through a user interface, can be gathered in an automated format from other services, as well as combinations of automated services and manual entry. Application Programming Interfaces (API) may be provided by services, such as social networking services, which can ease gathering of information during account creation.

Now turning to FIG. 3, account creation (202) and information gathering (204) can be implemented by obtaining (302) contact information, such as an e-mail address, a login identifier, a password, a telephone number, or other identifying information. Other personal information can be queried (304), including a full legal name, variations of the name by which the person may be known, hobbies, activities, clubs, organizations, and so on may be queried. Work information may also be the subject of a query (306). In some usage scenarios, pre-search queries may be used primarily in the context of business (as opposed to usage for search about personal information), and in such a context, querying (306) for work information may be prioritized over non-work personal information. Work information that may be queried can include present and past employment, job titles, examples of publications, or products that are representative of work performed by the person, and so on can be provided. FIG. 3 also depicts that other information can be queried (308), indicating that the examples of particular information that can be queried are exemplary, rather than limiting.

FIG. 12 depicts an example user interface that can be used for information querying. FIG. 12 depicts a simplified interface that allows a user to begin using the system with basic information. FIG. 12 depicts that a name field 1205 can be provided to query a first name, last name, and optionally a maiden name, nick name, or other name, such as a given name in another language. A work field 1210 can be provided, for accepting entry of a user's present and optionally past employment. A user can be allowed to enter more information by activating expansion button 1211. An additional information field 1215 accepts unstructured information from the user. An activation button 1220 can be provided, allowing the user to indicate that initial information entry is finished. As would be apparent from this example, other user interfaces can be provided that would solicit such information, or other information as desired. For example, if the search query were being created for a company or a product, then the initial information entry would be different.

As depicted in FIG. 12, an example herein is developing a search query for a person. In FIG. 12, the example is directed to developing a query for President Herbert Hoover. To demonstrate certain features, only a last name is provided to the system, such that potential confusion between J. Edgar Hoover and Herbert Hoover is caused, and disambiguated.

The information queried, as explained in FIG. 3, can be used during pre-search query formation. Constituent steps of information gathering can be performed as necessary. For example, in some cases, a name and a present employer and a past employer can be queried first, and in some implementations, even before an account is created. This approach is explained in more detail with respect to FIGS. 10-16, which depict elements of an interface that can be provided for pre-search query definition.

Figure 4:
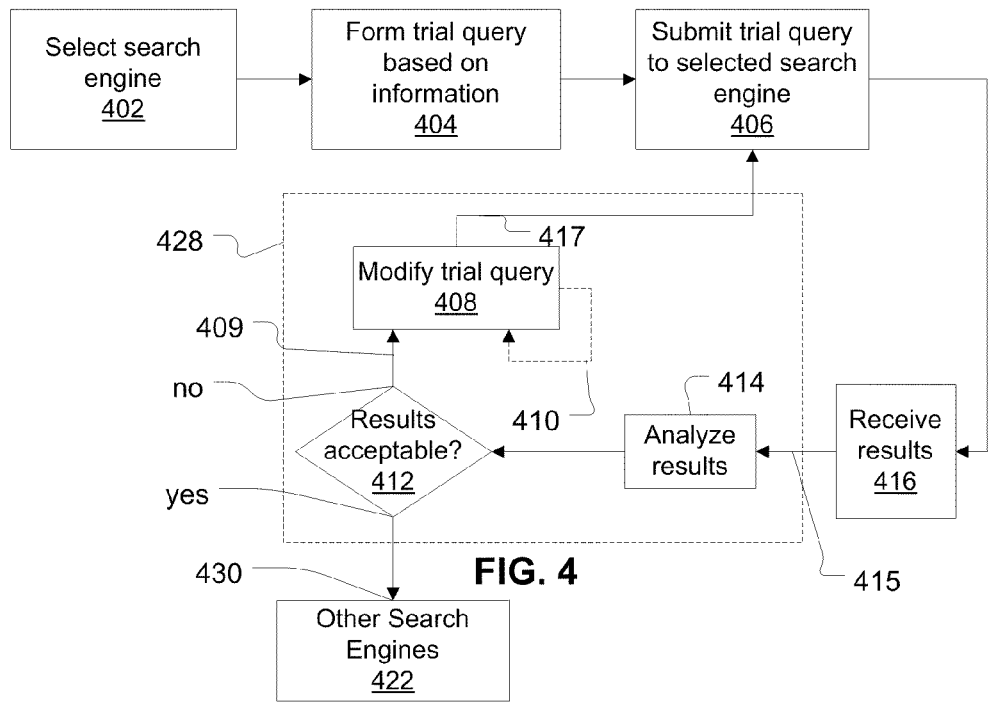
FIGS. 4-6 depict approaches to pre-search query revision.

FIG. 4 depicts a first example method for performing query determination (206). FIG. 4 depicts a method that includes selecting (402) a search engine, or receiving a selection of a search engine. Since different search engines may have different search protocols or different results ranking and results ordering techniques, pre-search queries preferably are tailored to a particular search engine.

Multiple search engines can be selected, and preferably a pre-search query can be determined for each (may be the same query, if, for example, the results returned for the query are acceptable for all selected search engines). The search engine selection preferably is made from a group consisting of the leading Internet search engines, including: Google, Bing, Ask, Yahoo! and the like. This group may differ by country, such that a user can have a query formed for different search engines for use in different countries. The user also can be informed that although one search engine may be initially selected, additional queries can be created later for other search engines.

The method depicted in FIG. 4 continues with forming a trial search query based on information gathered (e.g., in information gathering 204). The initial trial query can be formed based on the name of the user (example of query formation for the user). In one example, the trial query can be formed using only the user's name. The name can be used as a phrase (exact search) or as two or more separate words (e.g., one word being a first name and a second word being a last name.) In another example, the initial trial query can include the name of the user and a current employer. In another example, the initial trial query can include the name of the user, a current employer and a past employer. Logical operators can be included to specify that results returned should have all search terms, at least one search term, or a specified subset of the search terms. Other search logic also can be employed, if available through the search engine, such as proximity between different search terms, and so on. That query is submitted (406) to the selected search engine, and results are received (416).

The results are analyzed (414), and in a decision point (412), it is determined whether the results are acceptable or not. If the results are unacceptable, then the trial query is modified (408). Subsequently, the modified trial query can be (re)submitted (406) to the search engine again. The modifying (408) itself can include one or more iterations, represented by feedback loop 410. As explained below, these iterations can include querying and receiving input from a person about the search results, such as a selection of one or more preferred results, or results to be excluded. If the results are acceptable, then the method of FIG. 4 may continue with transaction completion (208).

FIG. 4 thus depicts that methods of query formation according to these examples can include forming trial search queries, followed by modifications to the trial queries, in order to arrive at a query that returns appropriate or desired results. Examples of how each of the actions depicted in FIG. 4 can be implemented are depicted in the figures that follow and are described below.

Figure 5:
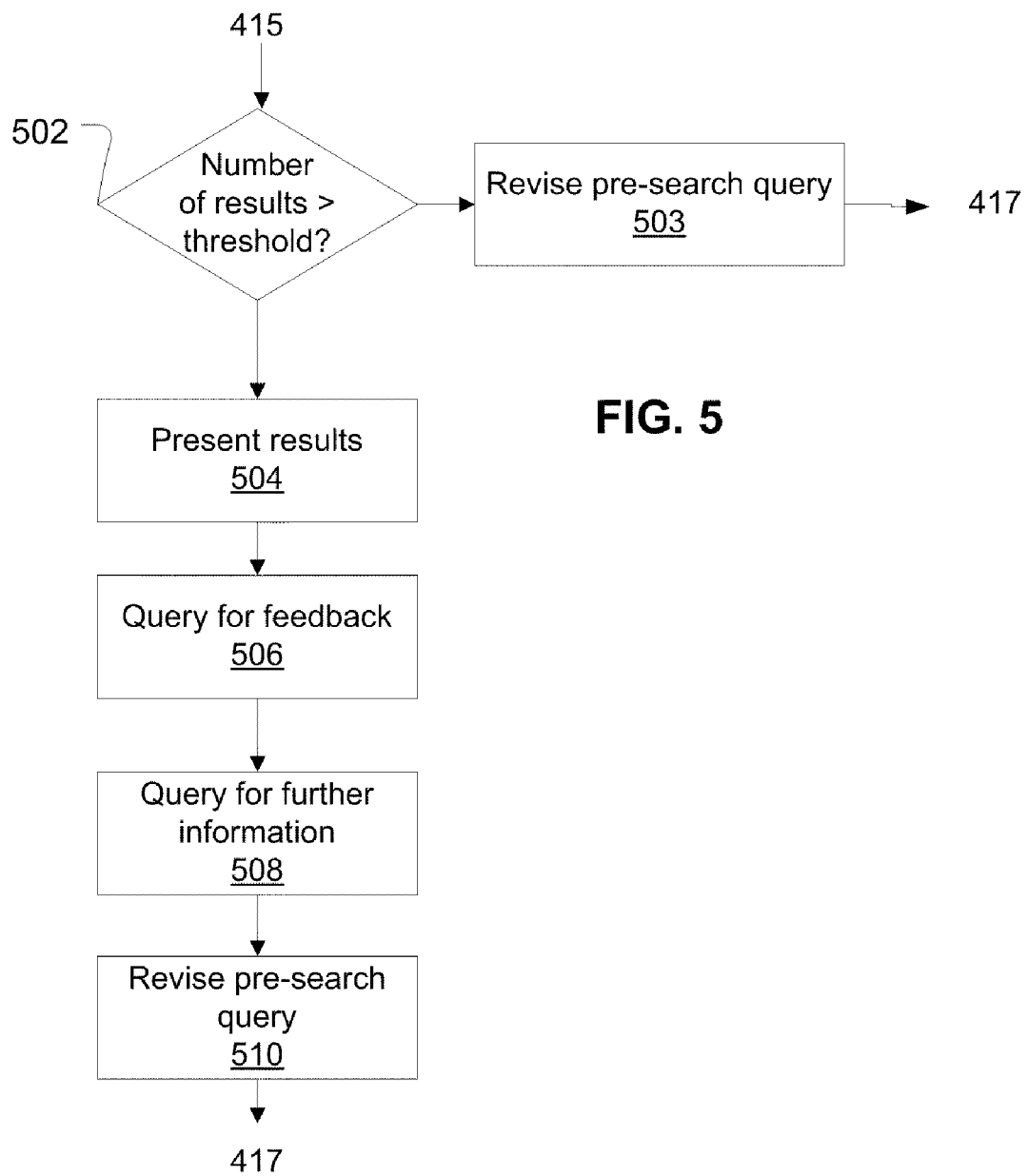

FIG. 5 depicts a first example of how results generated by using a trial query can be analyzed. FIG. 5 principally concerns an automatic revision approach to an initial trial query, and can be entered after receiving results (416), as identified by reference number 415. As such, FIG. 5 depicts an example of results analysis (414) and query modification (408). FIG. 5 depicts that a determination whether a number of results returned for a trial query is greater than a threshold number (alternatively, greater or equal to a threshold), and if so, then the trial query is revised (503), and the depicted method can return to submitting (406) the revised trial query to the search engine (identified by reference 417). For example, in one example, a first trial query can use the name of a person as two separate words, and if too many results are returned, then the trial query can be modified to include the name as a phrase search. In another example, a current employer can be included in a first modification.

If upon returning to determination 502, if the number of results continues to be greater than the threshold, then a still further element of information can be added. These information elements (or terms) can be obtained during information gathering (204). If no further information elements are available for use, then the method can instead proceed with the remainder of the method depicted in FIG. 5, described below.

If the number of results is not greater than the threshold, then the results are presented (504) on an interface (e.g., provided for display in a browser, such as in UI 127 implemented using browser 126). Feedback on the results can be queried (506). In one example, UI 127 is provisioned for querying feedback as depicted in FIG. 15.

Figure 13:
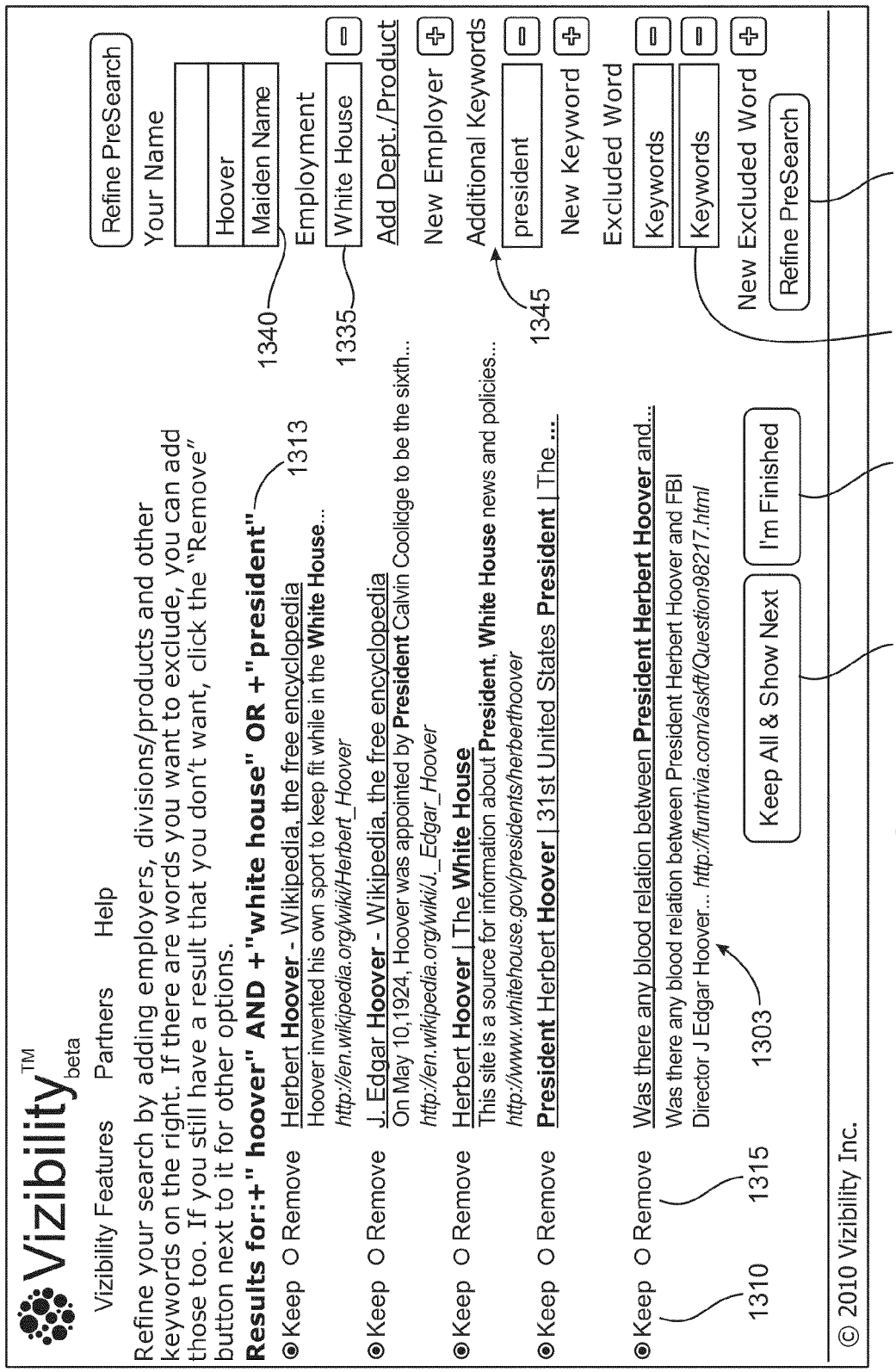

In particular FIG. 13 depicts that portions of the received results (FIG. 13 depicts 4 results at a time, other examples can depict fewer or more results) can be presented. Each result (result 1303 identified specifically) can be associated with a radio button for indicating that the result is to be kept (retained) 1310 and a radio button for indicating that the result is to be removed 1315. In one example, by default, button 1310 (result kept) can be selected, such that results are retained, unless button 1315 is selected.

The usage of buttons 1310 and 1315 for querying which results should be kept and which should be removed is one example of querying for feedback (506). In additional to querying about the handling of specific results, information already gathered (e.g., in 204) can be displayed, such as along a right-hand portion of the interface. For example, a name field 1340, an employer field 1335, an additional keywords field 1345, and an excluded word field 1350 can be provided on the interface. Name field 1340 can include sub-fields for a first name, last name, and maiden name. The name(s) currently provided can be displayed, while boxes descriptively labeled for categories of not-yet-provided information can be displayed. These fields depict an example of querying (508) for further information. In one operating example, after a user reviews the search results, the user may detect one or more concepts in common for results that the user would like to retain or to remove. The user can then enter information related to those concepts in the fields depicted (where information related to results to be results would be entered into the excluded word field 1350).

FIG. 14 further depicts how radio buttons can be provided to indicate removal or retention of each search result provided, where in particular, the result for J. Edgar Hoover has been indicated to be removed (indicated by 1405). FIG. 14 also depicts that exclusionary and inclusionary keywords can be added or inserted, by manual and/or automated processes described herein. Like numbers from FIG. 13 identify common elements appearing in the depiction of FIG. 14. The remove/exclude word entry field is depicted as being populated with an entry 1410, which can either be filled in manually or assisted by the user interface approach of FIG. 15 and associated methods, and systems that can execute such methods. As will be explained below, the excluded word can be determined based on content from the entry to be removed. For example, the entry 1303 appears to confuse J. Edgar Hoover with President Herbert Hoover, so an appropriate way to exclude or remove such entry would be to exclude the term Edgar from the search, as shown with entry 1410.

Other example user interfaces can implement a ranking system, in which the user or the system can rank desirability of retaining or excluding certain results. Such ranking information also can provide an input into the selection of tags or concepts for results to be retained or excluded. For example, a concept related to a highly desirable search result, even if it also appears in a result to be removed, preferably would not be selected (or suggested as a selection) as a concept to exclude from the search.

A further example of feedback (506) that can be queried from the user, and provided through an interface, such as that depicted in FIG. 14 is whether certain results are favorites. A limit on a number of favorite search results can be provided, such as 3, 5, or 10 results. Indications of these favorites then can be stored, and information about those favorites can be provided in conjunction with the URL that references the pre-defined search query, which is an output of some of the systems and methods described herein (as described, for example, with respect to FIG. 17, which depicts a user customizable selection of a short URL for referencing a query defined using the approaches described herein). For example, summaries of the favorites can be provided as text, or links to the search results also can be provided. Still further, a page can be provided that includes a redirect link that allows selection of the pre-defined query, and also contains links to the favorite search results. For example, a page referenced by the short URL can include a redirect to results returned by the pre-defined query, as well as links or other information about the favorites. The page can be incorporated to be rendered on other pages, such as Facebook landing pages, home pages, LinkedIn pages and so on.

Upon receiving feedback (506) and/or further information (508), the trial query can be revised (510) and the method can return to submitting (406) the query to the search engine again.

Other aspects of the user interface example of FIG. 13 include that a button to keep all results and advance to the next results (1315) can be provided, selection of which would advance the display to the next results and cause any results feedback entered to be submitted (such as through an HTTP POST command). A button to indicate that the user is done reviewing results (1325) can be provided as well. If the user selects this button, then feedback entered is submitted, but then the query is thereafter revised (510) and submitted (406), without displaying the rest of the results from that trial query. A button 1330 to indicate that the user is ready to re-submit the query also can be provided.

Figure 6:
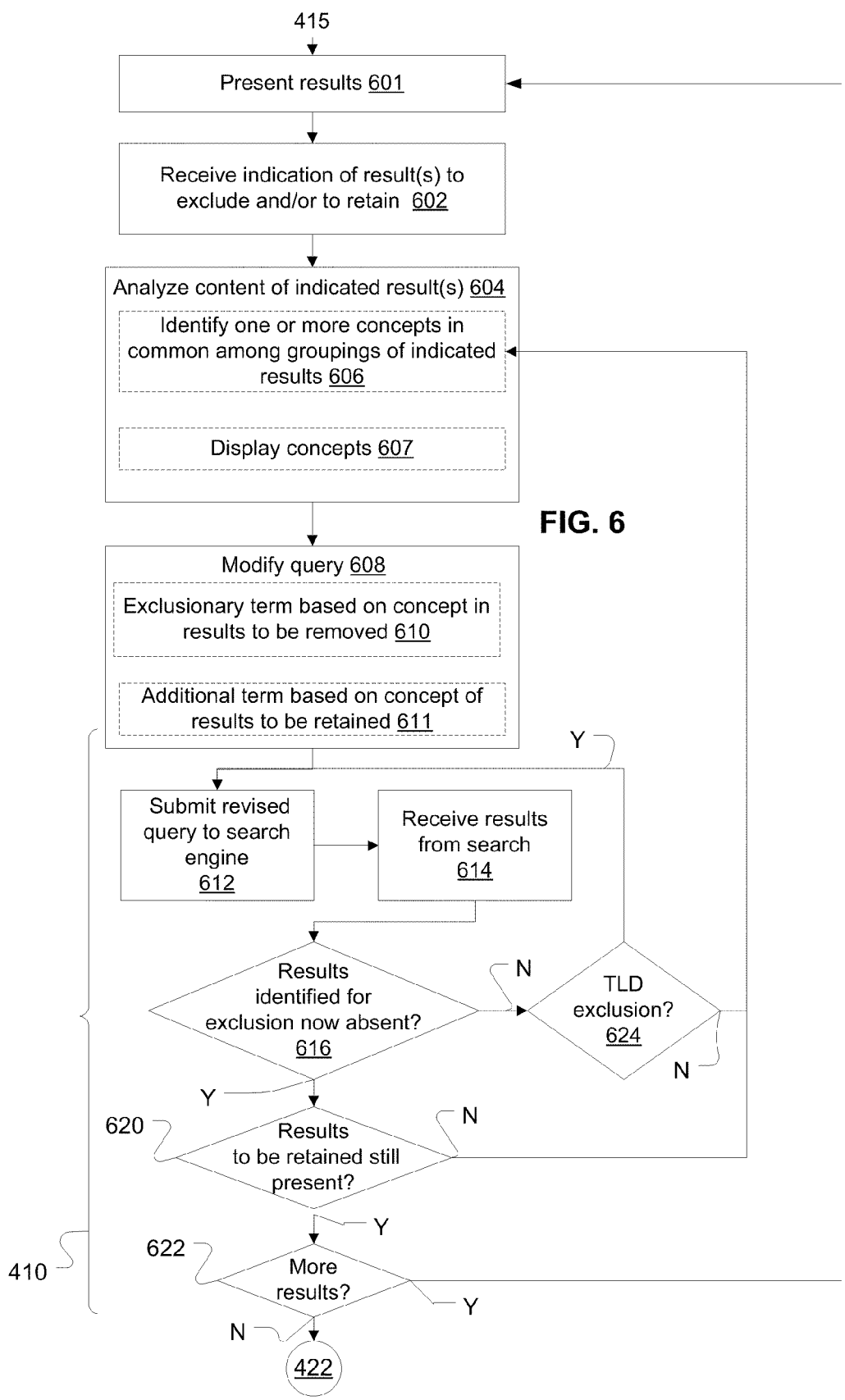

FIG. 6 depicts another example of a method of analyzing and obtaining feedback on search results for the trial query, in order to revise it. FIG. 6 depicts that search results can be presented (601), such as by being displayed according to the example of FIG. 15. The example method of FIG. 6 accepts (602) feedback concerning one or more results to retain or exclude, such as through the radio button approach depicted in FIG. 15 and described above. In addition to accepting (602) such feedback, the depicted method also analyzes (604) content of the indicated results, such as one or more results indicated for exclusion or retention. In one approach to analysis (604), one or more concepts related to the indicated results are identified, such as by identifying important words, such as by identifying rare words, or words that unexpectedly appear more often than statistically probable. Words indicative of such concepts can be displayed (607), in order to inform the user that such concepts were considered to be present in the results identified in the feedback.

Such display (607) can help a user to identify one or more additional elements of information that can be submitted through UI 127 (as described with respect to FIG. 14). The user also can manually enter one or more words to be excluded through UI 127. As described below, the concepts displayed can be displayed as selectable links, and if the concepts were identified for results to be removed, the selection of any of the links can have the same effect as entering such concept words in the exclusionary window 1550; conversely if the concepts corresponded to results to be retained, then concepts corresponding to selected links can have the same effect as entering such concept words in the additional keywords window 1545.

Query modification (608) can use concepts identified, or other input to determine an exclusionary term to remove or avoid a concept presently appearing in the search results (610). Additionally, or in substitution, further terms can be added to emphasize a particular concept or result over others (611).

FIG. 15 depicts an example approach to showing concepts identified in a search result to be removed by providing a window 1500 that appears when a search result has been indicated to be removed. An example search result to be removed is identified by 1505 (and would generally be repeated from the page of all search results, as a reminder). Window 1500 can provide suggestions as to a preferred approach 1510—adding another term or terms, a secondary approach—adding an exclusionary term 1515. Supporting that end, concepts identified are displayed (1515). Finally, an option to exclude a top level domain also is provided (1520).

In some examples, after determining concept words for one or more of inclusion and exclusion, the user can cause the query as revised to be resubmitted (612), such as by selecting refine search link 1530. In other examples, after determining such concept words, query revision and submission can occur automatically, such that the user does not need to explicitly indicate that the query should be resubmitted. In still other examples, the concepts are not displayed to the user, and one or more iterations query revision can occur automatically.

In most cases contemplated, after submission (612), results responsive to that query are received (614). A verification procedure can be implemented, in which the results returned by the revised query are compared with the feedback previously received. By particular example, a determination (616) whether results identified for exclusion are absent from the returned results. If any of such results remain in the results returned, then an option to exclude a top level domain (TLD) for each such result can be presented (624). If the TLD exclusion option is selected, then the query can again be submitted (612). If the TLD exclusion option is not selected, then analysis (604) can be repeated. If the results to be excluded are now absent, then a determination (622) is made as to whether more results remain to be displayed if the results are paged, such that more results were returned, but not yet displayed, then another page of results can be presented (601) and the steps described above can be repeated for those results.

The above process thus discloses an approach to reviewing pages of results, soliciting feedback on the results, where one example of the feedback can include identifications of particular results to retain, results to exclude, or both. A further aspect disclosed with respect to FIG. 6 is that concepts in results selected for removal or selection can be identified, and presented to a user. The user can select from those concepts to narrow or broaden a search. An automated process also can select from such concepts, and resubmit the query and then determine whether the results indicated to be retained and/or removed have actually been retained or removed. In other implementations, concept words or other search modifications can be selected by the user, and then a verification process can be undertaken to determine whether the desired results have been retained and/or removed.

FIG. 16 depicts outputs of one or more iterations of using the interface of FIG. 15, and methods that may be used in implementing the interface. For example, new additional keyword "Stanford" 1620 can be entered, to focus results of the search more towards the Herbert Hoover Institution at Stanford University. Excluded word "Edgar" 1410 was previously described; additional words that can be added are depicted to include "squidblogs" 1610 and "amazon.com" 1615. For example, based on concepts displayed to a user in the interface of FIG. 15, these keywords can be excluded from the search. The running search representation 1313 shows that these search changes can be made to appear, and example results are shown.

Figure 7:
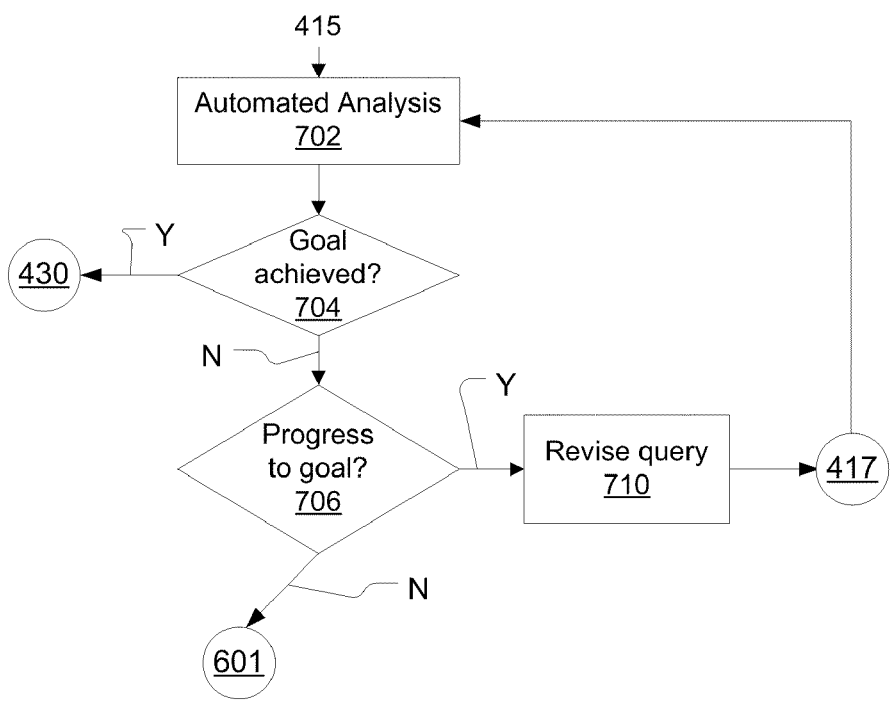
FIG. 7 depicts aspects of an approach to automated pre-search query revision.
Figure 8:
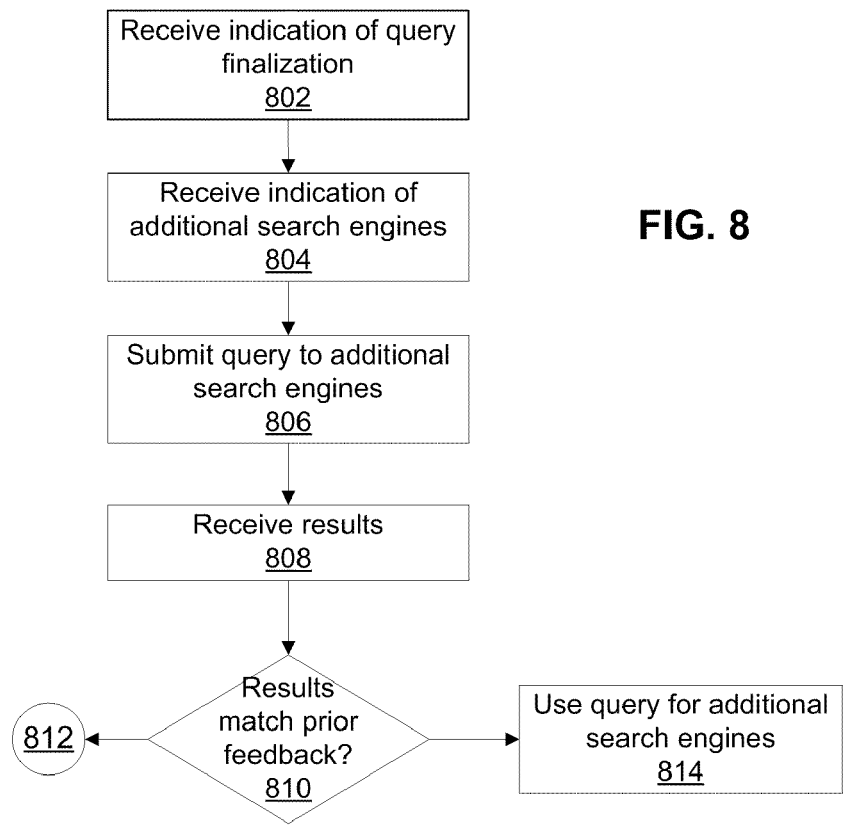
FIG. 8 depicts example aspects of a method for obtaining a pre-search query.

FIG. 7 depicts that aspects of query tailoring can be accomplished automatically. Entering from 415 (FIG. 4), an automated analysis action can be conducted. Such automated analysis can include, for example, comparing search results returned to the search results indicated to be retained and/or removed. It is determined (704) whether a goal was achieved (e.g., removing a particular concept or search result, or retaining or emphasizing a search result or concept). Even if the goal was not entirely accomplished, progress can be made (such as excluding some search results indicated to be removed, but failing to exclude others). In that case, the query is further revised (710), such as by adding further terms or excluding other terms. If progress was not made towards the goal, then the manual revising process can be re-entered (going to 601). If the goal was accomplished (704), then the process can move onto other search engines (shown by element 430, FIG. 4), for example. As such, FIG. 7 discloses that once feedback or other information is received about a query, the system can operate at least somewhat autonomously to determine a search query that accomplishes the feedback or changes identified.

Ultimately, by manual changes, automated changes, or a combination thereof, a query is finalized. Query finalization (802) can be determined by a user indicating satisfaction or by virtue of determining that a goal of automated analysis was achieved. An opportunity to obtain queries for other search engines can be provided (804/806), and if the results match those indicated as final for the first query (810), then queries for those search engines also can be finalized (814), such that results presentation and revision process does not need to be conducted for each additional search engine. If results do not match, then a query revision process can occur according to any one or more of the examples disclosed above.

In the above description, analysis and concept identification for inclusion or exclusion can use information available from each search engine. For example, common elements from all accepted and/or rejected entries can be identified. These common elements can be added to the query as the appropriate Boolean statements (or in whatever form the search query must take as dictated by each specific target search engine). By further example, if the search engine produces results based on weighted search terms, the highest ranked desirable entries will also be analyzed for common elements and added to the search query as required by the search engine to indicate a higher level of importance.

In sum, aspects that can be implemented in these examples include that a short, custom, URL (preferably a permanent short URL) is selected or otherwise determined to reference a particular query determined by a user. The user can distribute that URL to third parties or otherwise provide the URL through electronic means, such as on web pages, through SMS and so on. Thus, the user maintains an association with the URL referencing the query he created. Requests made for the resource referenced by the URL (i.e., the query definition) can be redirected to the search engine, so that live results are obtained from the search engine. Information about the sources of such requests, and other statistics can be maintained and obtained concerning such requests. Alerts can be sent to the user associated with the URL when a request is made for it. Such alerts can be sent via email, SMS, or posted to feeds such as Twitter®, Facebook® Wall, LinkedIn® status updates, as examples.

In further summary, URLs can be created for each of a number of search engines, so that different characteristics, capabilities, and algorithms for each search engine can be used or accounted for in determining a query definition that returns desired results. A default search engine can be selected by the user; a search engine can sponsor the default query position.

Figure 9A:
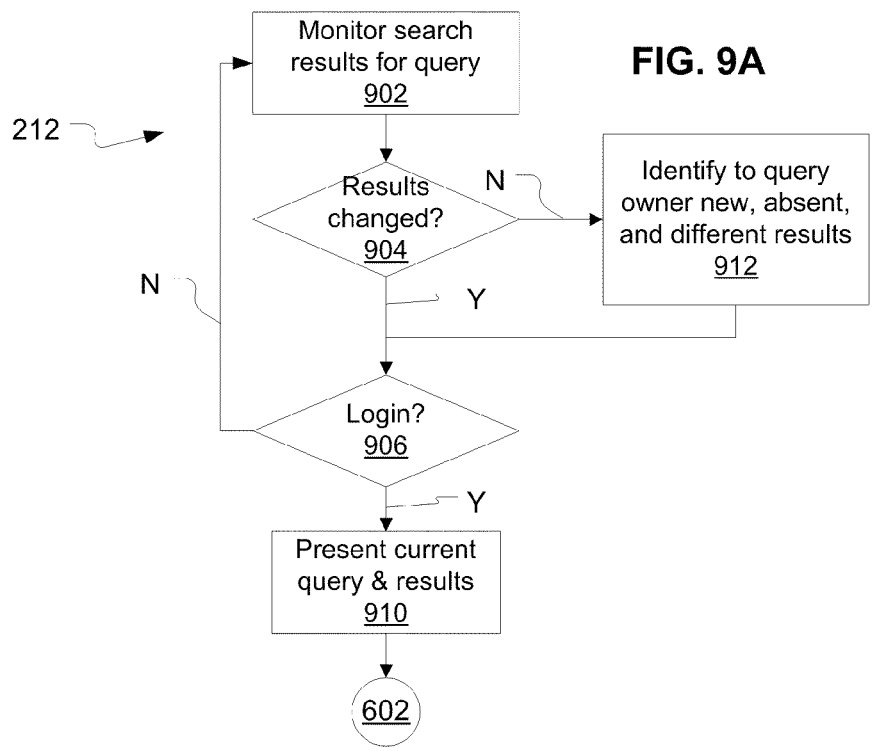
FIGS. 9A and 9B depict example methods of monitoring results returned for a pre-search query and usage of a pre-search query on the Internet.

FIG. 9A depicts an example method for monitoring search results of queries that have been established, and providing a user an alert concerning such change. In particular, FIG. 9A depicts a method that includes monitoring (902) search results for a defined query (e.g., defined according to the above disclosure). As will be disclosed with respect to FIG. 10, below, one aspect of publishing or otherwise finalizing a search query is that results returned by the search after a user gives approval are stored. So, results returned at 902 are compared (904) with the stored results.

Figure 21:
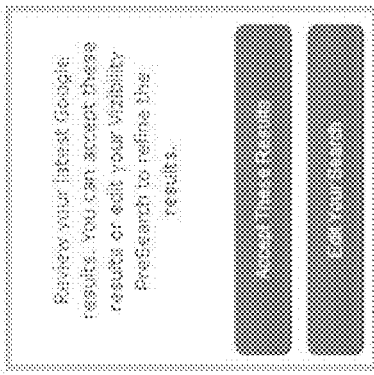
Figure 22:
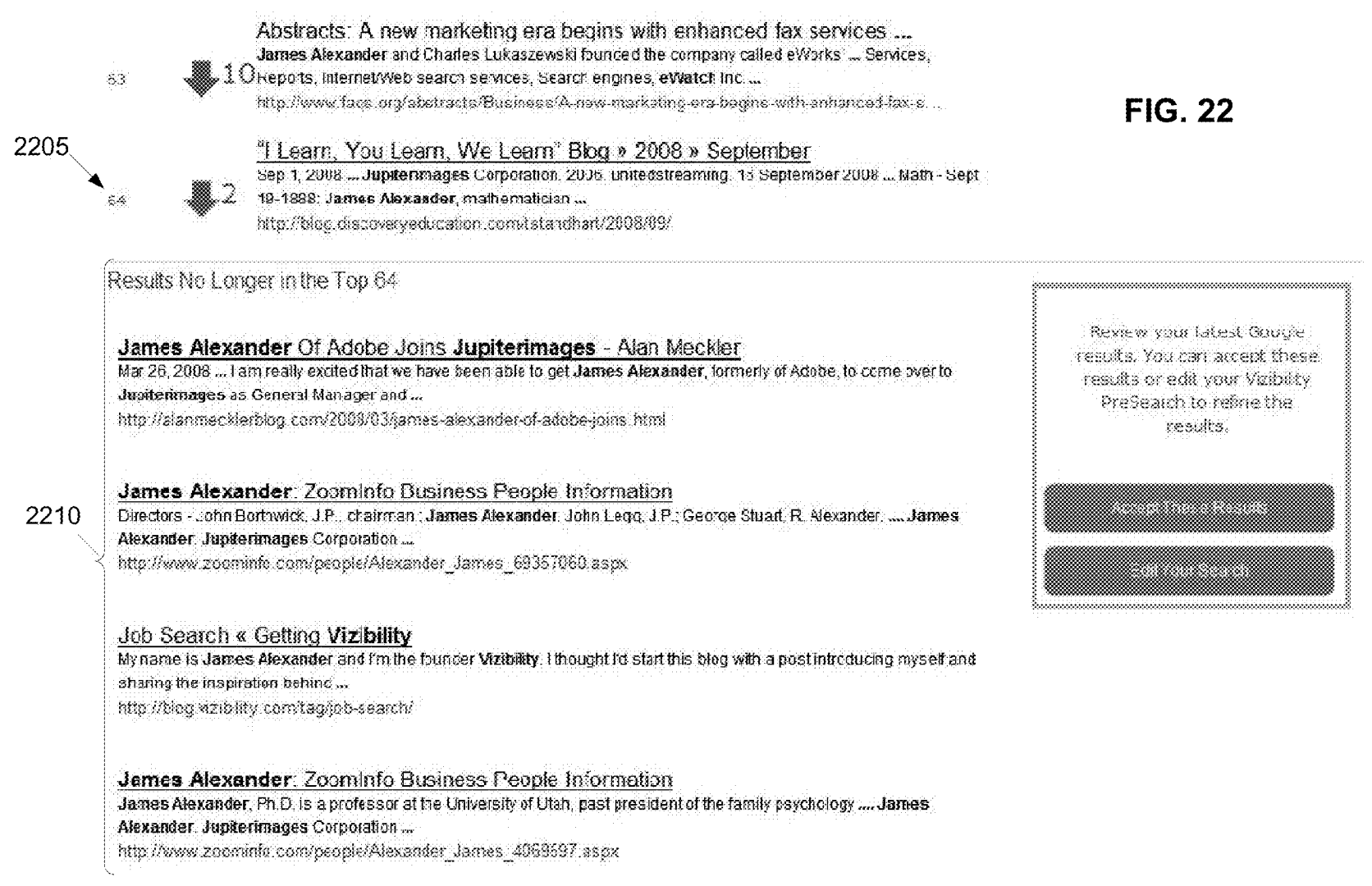

An example of a user interface element that can be used to describe changes in search results returned for a particular query is depicted in FIG. 21 and FIG. 22. In FIG. 21, it is depicted that the example information provided includes information about what set of results serves as the baseline from which the present comparison is conducted, and in particular can include identifying information for a search engine generating the results, and when the search was originally run (2102), as well as an indication of when the present report was run (2102). The information about the search results comprises information about relative positioning of the results returned. For example, result 2105, is in the number 3 spot, and the arrow with the number 1 depicts by that result indicates that the result was in the number 4 spot previously, and thus has been promoted one position by the search engine, when comparing the present results to the baseline results (2102). Result 2110, similarly, is indicated as having been promoted 7 spots, while result 2112 is 2 spots lower than it was in the baseline results (2102). Result 2115 is new, compared with baseline results (2102), as indicated by the "New!" caption associated with it.

A floating window 2120 can be provide that allows a user to indicate whether the results returned are acceptable, and provides interface elements that allow acceptance of the results, which can cause the baseline set of search results to be updated, or if the search is to be edited, then the edit your search button can be selected, and can take the user to an entry point in redefining the pre-defined query. Ultimately, the output of the pre-search query definition process would produce another set of search results, which can be used as the baseline results (2102), for further comparisons in the future.

FIG. 22 depicts that in addition to results that are in a different order or are new, results that no longer appear in the top 64 entries (2210) (or in the number of entries that are returned by a given search engine under normal circumstances), are shown. Result 2205 is the $64^{th}$ result, and in this example, the search engine used returns 64 results through usage of an API. Thus, results that are the $65^{th}$ and subsequent results would not be visible to a user who accessed the pre-search query. This result may or may not be acceptable or desirable to an owner of the query, and again, the option either to accept the results or edit the search (described with respect to FIG. 21 can be provided).

It is to be understood that the concept of new results or results that are not included can depend on a number of results returned by a given search engine, or under a given definition of a query. For example, if fewer search results are returned, then more results will be excluded. Similarly, even though a search result may have been returned as the $80^{th}$ entry, in a search that returns 100 results, only until that result is within the first 64 results, would it be considered present, and then it would be considered a new result.

The information depicted in the user interface examples of FIGS. 21 and 22 can be provided in textual form, such as in an SMS, or e-mail, or other form of contact, or can be provided on a web page referenced by a URL included in a message to a contact associated with a given query. Other parameters can be defined for a given user, such as whether to show all results returned, only those that changed, are new or removed, or only those that now appear on the first page, or no longer appear on the first page, but did before, and so on. As such, the change information provides a summary or more information about what a person sees when the pre-search query is used.

Figure 9B:
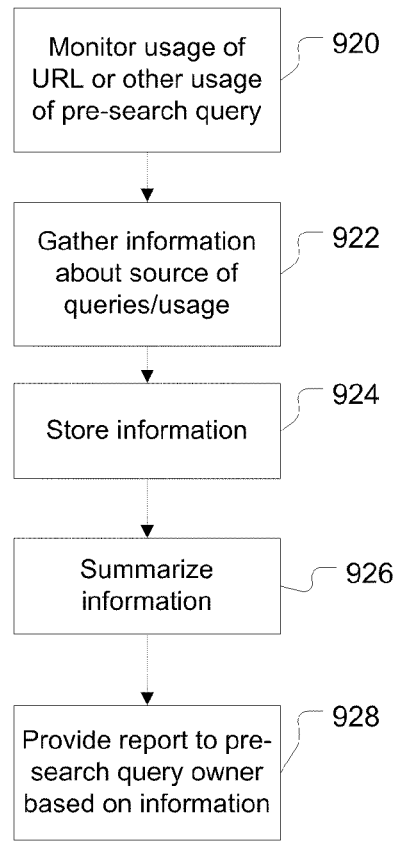

FIG. 9B depicts a method relating to notifying a contact related to a given pre-defined query (pre-search query) of usage of the query, which can be detected based on requests for the query received through the URL referencing the query. The information may comprise monitoring (920) and reporting (928), which can include generating notification(s) that the query was used, as well as statistics or summary information about query usage, which can include information about sources of requests for the query, such as general geographic area, WhoIs database information, IP address information, and so on. Other information may be gathered (922) and provided where available, such as by cross-referencing to databases mapping information that can be obtained from requests for the query, such as IP address, to information about owners of the IP addresses. Such information provided in a report (928) can include summarized information (926). Any such information gathered or otherwise obtained can be stored (924).

Of course, a complete and literal storing of the results need not be conducted. For example, hashes can be created and stored. The content of the results may be stored uncompressed as presented, compressed in derivative form, or in some combination of these. The search can be rerun or results compared on a prescribed time interval or responsive to the occurrence of defined actions. The content of the results may be stored on a network accessible resource, or on an electronic device of the user, in some other location, or in some combination of these.

And whenever a discrepancy between the approved search results and the current search results is discovered, the user will be contacted (912). In the event of a change, users may receive an email or other notification indicating that the search results from their finalized query have changed. Preferably, which result or results have changed, are new, or are now absent are identified to the owner/user who created the query. The method detects login by the user (906), and the query results, or changes thereto can be presented (910) to the user (user can login, even if results have not changed). The method can then go to 602 of FIG. 6, allowing the user to adjust the query, or otherwise providing information or direction to modify the query in order to adjust the search results returned.

For example, when notifying the user (at 912), the user may be given information detailing specific changes in the results (e.g., the e-mail may identify new results, changed results, and absent results that used to appear). The email or other notification may provide a form or a link to a form allowing feedback on the changed results, and the feedback can be feed into the processes disclosed for updating the query to reflect the results desired by the user once again (to the extent possible or practical).

By further example, users can be directed to log into the site via a link included in an SMS, email, posting to a social networking communication stream, such as Facebook, Twitter, or another communication mechanism that can be selected by the user, or any combination thereof. Also as the user is logged in, the user can be given access to information, such as a summary about access to his search query since a prior login or during a defined period of time. Such information also can be included in the notification.

In sum, each time a user logs into the system, the user preferably is enabled to re-run the query definition methodologies to change any or all of their queries. The user may also be able to view all of their searches and the URLs for each search engine. The user may also be able to redownload standard button graphics (via HTML) so they may post on any site that resolves to their URL(s). Additionally, an interface where the user can view a "dashboard" (graphs, maps and other visual tools) depicting quantity, time, location and/or other relevant and available information of when the URL was used can be provided.

A further element that can be provide in a method according to FIG. 9 is that the user can be notified periodically that search results have not changed ('no news is good news'), such notification also can include usage statistics, and a login link.

The separate identification of these components does not imply that the components are implemented separately. Also, the usage of certain programming techniques and paradigms are by way of example, rather than limitation, and a person of ordinary skill in the art can provide equivalent approaches in providing embodiments according to these disclosures.

Although illustrated embodiments of the present invention has been described, it should be understood that various changes, substitutions, and alterations can be made by one of ordinary skill in the art without departing from the scope of the present invention.

Figure 10:
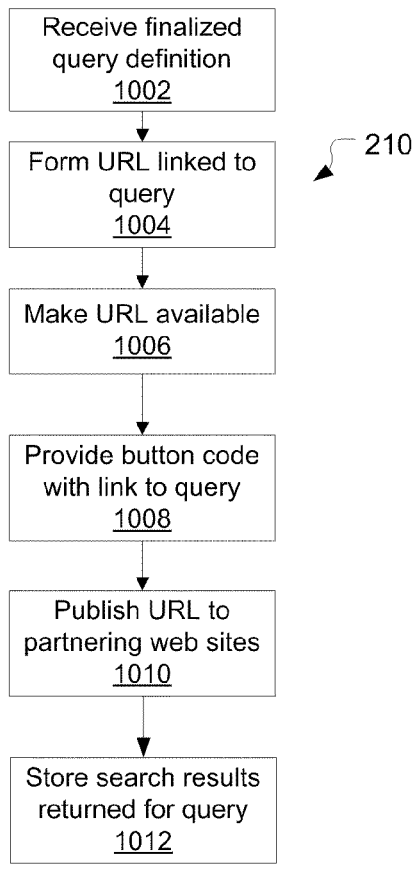
FIG. 10 depicts an example method of finalizing and publishing pre-search queries.

FIG. 10 depicts an example method of publishing the URL(s) created according to the above example methods. FIG. 10 depicts that a finalized query definition is received (1002) (received from the system or the user, such as through manual and/or automated analysis), a URL definition is proposed, or received (1004). The URL created is made available to the user, such as through a text box that can be copied, or via e-mail or SMS.

Code, or script, for a button that can be included on a web site also can be provided to the user (1008). The URL can be published (1010) to partnering web sites or properties. FIG. 17 depicts that a user can be presented with an interface for querying such information. For example, a field 1705 can be provided where the creator of the query can define a customized URL that will be used to refer to that query. Here, field 1705 shows that the name of the user, "Herbert Hoover", is entered. Thus, the defined query will become accessible by accessing this name at the Vizibility.Com domain. Account creation features 1710 can be provided, including fields for soliciting contact information and a password.

Figure 18:

For example, a user can provide login information to social networking sites, and the URL can be inserted into the properties of the user at those sites (see links 1810 in FIG. 18). Information about the search results returned are stored (1012), such as for use in the method of FIG. 9, as explained there. FIG. 18 depicts a user interface that can be provided for publishing the finalized query. A window 1805 with javascript code which can be copied can be provided (see 1008). Links 1810 can be made available. The links are to sites where the URL referencing the defined query can be placed. For example, links to social networking sites can be provided. The remainder of the elements of the UI depicted are self-descriptive, to a person of ordinary skill in the art.

Figure 19:
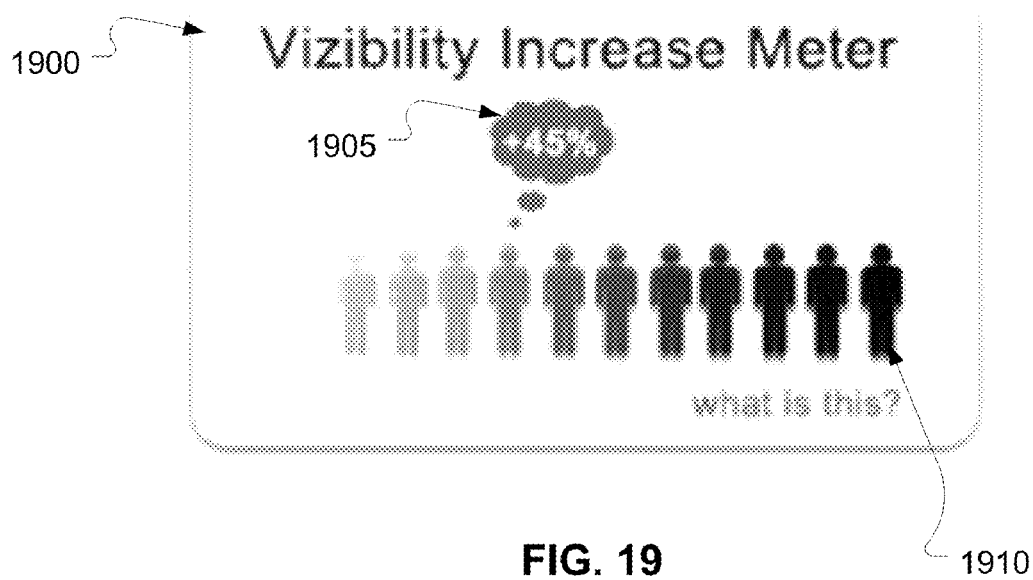
FIGS. 19-20 depict UI and method aspects relating to determining and indicating query improvement during the performance of query refinement methods described herein.
Figure 20:
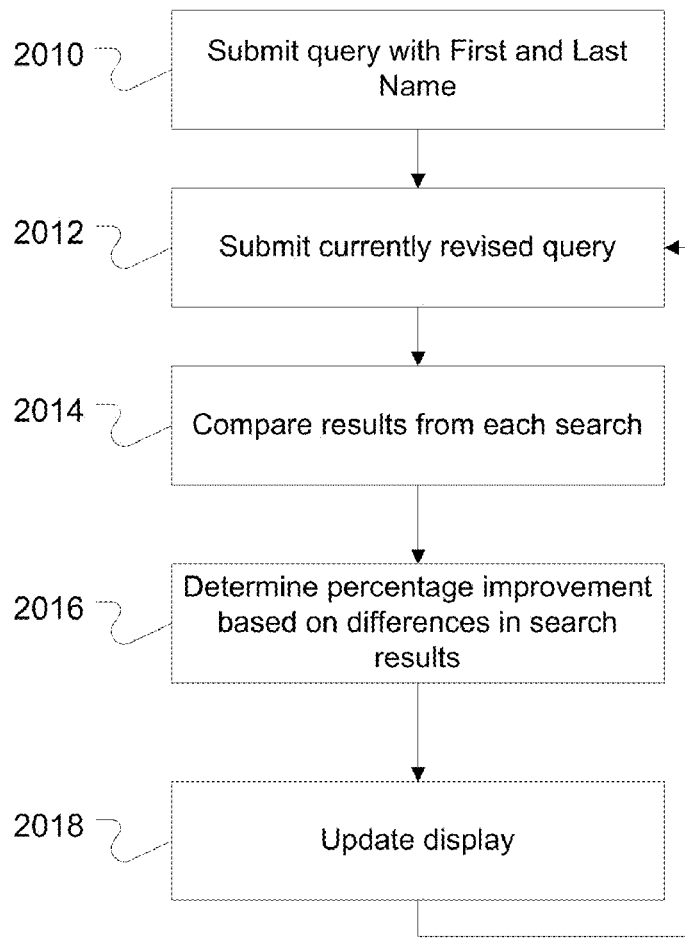

FIG. 19 depicts a user interface element 1900 that helps a user assess how the pre-search query is helping focus search results, compared with a baseline query. For example, the method of FIG. 20 depicts an approach where a baseline set of search results can be established by using only a user's name as a query definition (2010), for which a baseline set of search results is returned. As the query is revised, as explained above, the current query can be submitted (2012) to the search engine, and the results returned can be compared (2014) with the baseline set of search results. The submission and return of results here can be implemented during the query revision process, such that the submission and results returned here need not be separately conducted for the practice of the depicted method.

To the extent that the results returned for the current query differ from the baseline set of search results, it can be determined that the search results returned responsive to the current query better reflect the intentions of the user defining the query than the baseline search results. A numerical value for the degree of improvement in the search results returned can be determined (2016), and the display depicted in FIG. 19 can be updated.

Various approaches to determining a degree of improvement (which can be expressed as a numerical value) can be provided. For example, a number of search results that are different can be counted, and a percentage of results that are different of a total number of all the results returned can be used as numerical value (1905). Weightings attributed to particular search results also can be provided. For example, a particular search result may be identified by a user as being desirable or undesirable, and the presence or absence of that particular search result can weight the numerical value 1905 more heavily than a search result not considered either desired or undesired. Still further, an ordering of results can be considered in determining the numerical score, and such an implementation can provide a higher score of the search results returned from the present query include desired results more prominently than undesired results. A similar approach can be applied to keywords or themes identified in search results identified as being desired or undesired. As would be understood, the approach described here need not give any kind of numerical certainty, but rather is for giving an easily digestible heuristic feedback mechanism to allows a user to see that continued work on query refinement is either yielding better results or not. In that context, a variety of other implementations and approaches, and other data that can be gathered about the search results returned can be used in providing the score. Still further, other approaches for providing this feedback can be provided, and by further example, an increasingly definite or darker depiction of a person (1910) can be used to show increased improvement in search results. Such a display can be provided in conjunction with a numerical score, as depicted in FIG. 19, or in substitution for the numerical score. The method can iterate such that each time the query is revised, the score or other indicia of search results improvement can be updated automatically.

Figure 11:
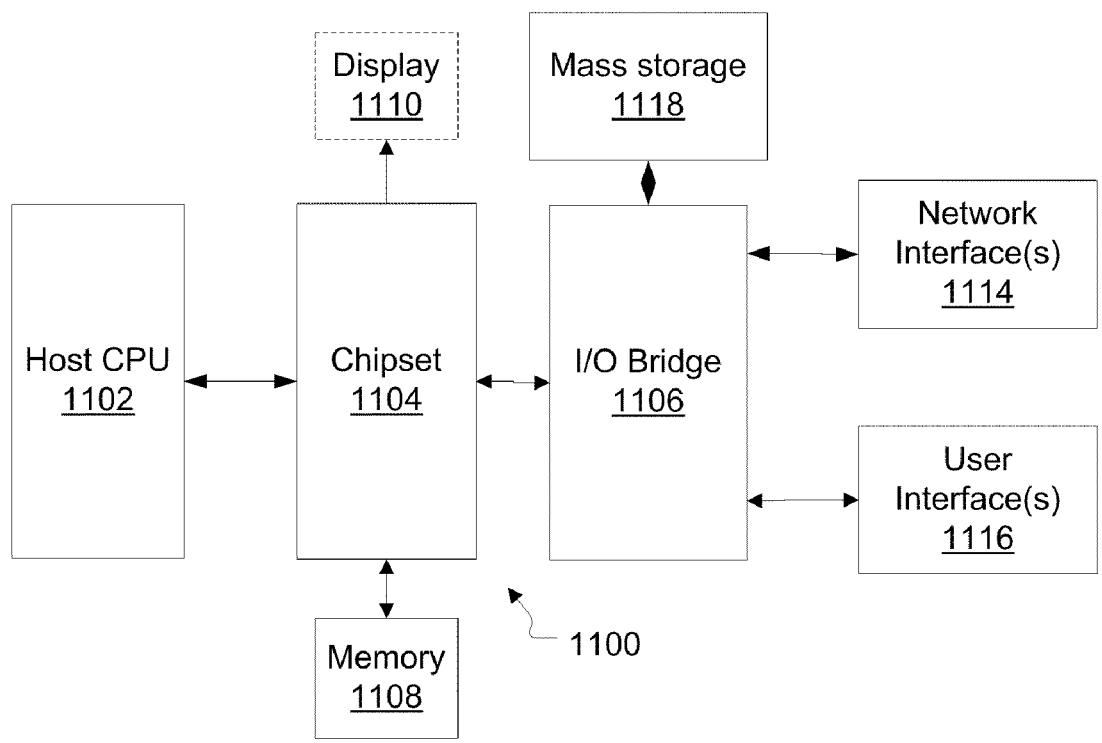
FIG. 11 depicts an example computer architecture that can be employed in implementing components of such systems.

FIG. 11 depicts an example of a computer system 1100 that can be used to implement described structural elements, such as the structural elements depicted in FIG. 1. By particular example, a computer system according to the example computer system 1100 can be used in executing browsers 126 and 125, a number of such systems 1100 can be employed at search engine 130, as well as at search query search query provider 110.

Example computer system 1100 may include a host Central Processing Unit (CPU) (1102), which may be implemented as a semiconductor containing one or more distinct microprocessor units, commonly called "cores", to indicate distinctness, but yet integration on a common substrate. Modern processors typically comprise multiple cores, such as 2, 4, 6, 8, 12 or more cores. Host CPU 1102 also can be implemented with a plurality of physically separate microprocessor units, disposed in separate sockets. Host CPU 1102 communicates with a chipset 1104, which typically includes memory bus logic, and other interfaces to other functionality, such as an expansion bus for supporting I/O, such as network traffic to and from network interface(s) 1114, mass storage 1118 (e.g., hard drives), as well as peripherals, such as those that can be provided for a user interface (1116). Example of such peripherals include a keyboard, serial I/O, a mouse, voice recognition inputs, touch screen inputs, and so on.

Chipset 1104 also may support connection of a display 1110, and therefore may include graphics logic for rendering content to be displayed. Such graphics logic may use main memory 1108 as video memory, or a separate video memory may be provided. Where system 1100 is used for implementing end-user computers, a display is more likely to be included. Frequently, if system 1100 is functioning as a server, a display would not be provided.

Of course, the example system 1100 is provided by way of example and not limitation as to what kinds of devices may be used in implementing aspects disclosed herein. Those of ordinary skill in the art may adapt the disclosures presented herein for use with a variety of devices, such as smartphones, tablet computers, laptops, and so on, which may be implemented using components that are more or less integrated than those depicted herein, and which may include more functionality or fewer functions than what is depicted in this example.

What is claimed is:

1. A computer-implemented method, comprising the acts of:

accepting one or more search terms, through an interface;

submitting, to an Internet search engine, a query defined from the accepted one or more search terms;

analyzing of the results received from the search engine to determine whether the results are acceptable;

responsive to determining that the results are acceptable, presenting the results, storing the query as a first pre-defined query, storing information describing the results determined to be acceptable, and producing a Uniform Resource Locator (URL) for referencing the first pre-defined query on the Internet;

responsive to determining that the results are not acceptable, based at least on determining that the number of results returned for the query is greater or less than a threshold number, presenting the results of the query on the interface, wherein each result presented is associated on the interface with an indication that the result is to be retained or to be removed, modifying the query by including at least one additional search term identified base on keywords associated with one or more of the results, and rerunning the search with the modified query, storing the modified query as a second pre-defined query, storing information describing the results returned for the modified query, and producing a Uniform Resource Locator (URL) for referencing the second pre-defined query on the Internet;

periodically submitting the first pre-defined query or the second pre-defined query to the Internet search engine, receiving results, and comparing the results with the respective presented results, based on the respective stored information; and producing an alert responsive to the comparison indicating that the compared results are different, wherein the differences detected by the comparison comprise new results, results that now are absent, and differences in an ordering of results.

2. A method as recited in claim 1, wherein the URL can be provided on a web page and accessed, and the method further comprises responsively notifying a contact associated with the first pre-defined query or the second pre-defined query that the URL was accessed.

* * * * *